United States Patent
Peterfreund (10) Patent No.: US 8,321,903 B2
(45) Date of Patent: Nov. 27, 2012

(54) EXTERNAL SERVICES ALLOCATION IN CLOSED ON-DEMAND SYSTEMS

(75) Inventor: Natan Peterfreund, Kiryut (IL)

(73) Assignee: Playcast Media Systems, Ltd., Kiryat Gat (IL)

( * ) Notice: Subject to any disclaimer, the term of this patent is extended or adjusted under 35 U.S.C. 154(b) by 1103 days.

(21) Appl. No.: 12/180,944

(22) Filed: Jul. 28, 2008

(65) Prior Publication Data
US 2010/0023977 A1 Jan. 28, 2010

(51) Int. Cl.
*H04N 7/173* (2011.01)
*H04J 3/18* (2006.01)
*H04J 3/04* (2006.01)

(52) U.S. Cl. ............ 725/109; 725/86; 725/93; 725/95; 725/98; 725/110; 370/477; 370/533

(58) Field of Classification Search .......... 725/109–110; 370/470, 533
See application file for complete search history.

(56) References Cited

U.S. PATENT DOCUMENTS

| | | | |
|---|---|---|---|
| 5,742,289 A | 4/1998 | Naylor et al. | |
| 6,154,772 A * | 11/2000 | Dunn et al. | 725/114 |
| 6,668,091 B1 | 12/2003 | Kim et al. | |
| 6,771,657 B1 * | 8/2004 | Elstermann | 370/465 |
| 6,996,098 B2 * | 2/2006 | Bertram et al. | 370/389 |
| 7,307,638 B2 | 12/2007 | Leather et al. | |
| 7,830,388 B1 | 11/2010 | Lu | |
| 7,868,893 B2 | 1/2011 | Feth et al. | |
| 8,166,192 B2 * | 4/2012 | Suh et al. | 709/231 |
| 2004/0017850 A1 | 1/2004 | Kim et al. | |
| 2004/0090996 A1 * | 5/2004 | Wu et al. | 370/535 |
| 2004/0213298 A1 * | 10/2004 | Sato | 370/537 |
| 2005/0010960 A1 | 1/2005 | Kitazawa et al. | |
| 2005/0030316 A1 | 2/2005 | Sirtori et al. | |

(Continued)

FOREIGN PATENT DOCUMENTS
EP 1 391 226 2/2004
(Continued)

OTHER PUBLICATIONS
Final Office Action received on U.S. Appl. No. 12/118,999 dated Jan. 3, 2012.
(Continued)

*Primary Examiner* — Nasser Goodarzi
*Assistant Examiner* — Mushfikh Alam
(74) *Attorney, Agent, or Firm* — Foley & Lardner, LLP (57) ABSTRACT

Integrating external on-demand services is performed through embedding a pseudo on-demand video-title for each new on-demand external service, which is activated by an original session manager (SM) once a particular set-top converter box (STB), which belongs to a particular group_id, initiates a request for the external service. An STB application intercepts SM tuning information on the selected transport_id and service_id of the pseudo service and recovers the address of the selected edge device and QAM in the original system, associated with the intercepted transport_id, through the inverse mapping the couple (group_id, transport_id) to the edge and QAM IP and UDP port addresses which map is set by external management system. The STB application initiates the external on-demand service with same edge and QAM but with a different unique external_service_id, through streaming of the external service to the recovered edge IP address and to a new UDP port number where the new UDP port number encodes the original QAM address with the new unique external_service_id number of the external service, and tunes to the new external_service_id.

19 Claims, 7 Drawing Sheets

U.S. PATENT DOCUMENTS

| | | | |
|---|---|---|---|
| 2005/0104889 A1 | 5/2005 | Clemie et al. | |
| 2005/0289619 A1* | 12/2005 | Melby | 725/95 |
| 2007/0009035 A1 | 1/2007 | Craig et al. | |
| 2009/0119738 A1* | 5/2009 | Perlman et al. | 725/133 |
| 2009/0193480 A1* | 7/2009 | Rodriguez | 725/109 |
| 2011/0128961 A1* | 6/2011 | Brooks et al. | 370/392 |

FOREIGN PATENT DOCUMENTS

| | | |
|---|---|---|
| EP | 1 496 704 | 1/2005 |
| FR | 2893439 | 5/2007 |
| WO | WO-98/30015 | 7/1998 |
| WO | WO-99/64944 | 12/1999 |
| WO | WO-02/092177 | 11/2002 |
| WO | WO-03/075116 | 9/2003 |

OTHER PUBLICATIONS

Notice of Allowance received on U.S. Appl. No. 12/118,999 dated May 1, 2012.

Notice of Allowance received on U.S. Appl. No. 12/125,359 dated Nov. 16, 2011.

International Preliminary Report on Patentability for PCT/IB2009/005917 mailed Nov. 25, 2010.

Zhang, et al., "Study on Adaptive Job Assignment for Multiprocessor Implementation of MPEG2 Video Encoding" IEEE Transaction on Industrial Electronics, vol. 44, 1997, pp. 726-734.

International Search Report and Written Opinion for PCT/IB2009/005917 mailed Mar. 25, 2010.

Non-final Office Action received for U.S. Appl. No. 12/118,999 dated May 25, 2011.

Non-final Office Action received for U.S. Appl. No. 12/125,359 dated Apr. 14, 2011.

Cheng, L. et al., "Real-Time 3D Graphics Streaming Using MPEG-4," *School of Information and Computer Science, University of California*, Irvine, CA, Jul. 18, 2004, pp. 1-16.

\* cited by examiner

EXTERNAL SERVICES ALLOCATION IN CLOSED ON-DEMAND SYSTEMS

FIELD

The present application relates to session resource management in on-demand video or switched broadcast systems in cable television (CATV) systems. Representative embodiments relate to streaming and processing of digital video services in on-demand systems cable television (CATV) systems.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

An architecture for on-demand services in cable television (CATV) systems, such as video on-demand (VoD), includes a plurality of on-demand services sources, such as VoD servers which store a library of video-titles streams in a compressed digital format and stream a given title, upon request, in a single program/service transport stream (SPTS) format, optionally a plurality of encryption engines, for encryption of the streamed titles, and a plurality of edge devices, each of which packetizes sub-sets of input streams into a multi program/service transport stream (MPTS) format, modulates each MPTS through a quadrature amplitude modulation (QAM), and transmits the radio frequency (RF) modulated signal to the set top box at the client's premises.

The stream transmission path: on-demand service source to encryption-device to edge-device to QAM is allocated and controlled by the session manager (SM) which controls the entire operation of the on-demand system.

Both SPTS and MPTS contain a program association table (PAT) which contains the MPTS identity (transport_id) and the service/program identities (service_id/program_id) of the services embedded in the stream, a program map table (PMT) for each service which contains the packets identity (PID) numbers of the elementary streams video and audio of the specific service, and the services elementary streams. Both SPTS and MPTS may contain no-information packets, denoted as NULL packets, for transport stream padding considerations. The service_id numbers and the associated PID within the SPTS and MPTS are unique.

The client region is split into sub-regions, denoted as service groups, each supported by a set of edge devices and defined set of on-demand services sources such as VoD or switched broadcast systems. Both on-demand services sources and edge devices can support multiple of service groups.

The set top box tunes to the particular QAM frequency and service, based on information it receives from the SM. The set top then decodes the particular service and presents the decoded audio-visual content.

An edge device contains multiple QAM modulators, each up-converted to a different radio frequency (RF). Each set of input SPTS streams to an edge device, is packed by the edge device into a single MPTS and directed to a particular QAM at a particular RF frequency. The services within the packed MPTS are allocated unique service_id numbers.

An MPTS is generated by re-multiplexing the packets of a set of SPTS streams, embedding a PAT and associated PMTs which contain the transport_id and service_id numbers of the embedded services and the PIDs of the corresponding elementary streams. Both service_ids and PIDs are remapped into unique numbers according to external setting. The re-multiplexing process filters NULL packets in the input services, and may add ones to obtain the desired MPTS bandwidth.

QAM is a modulation scheme which conveys data by modulating the amplitude of two carrier waves. The maximal data rate is defined by the analog bandwidth and constellation of the modulator. e.g. QAM256 with 8 Mbps bandwidth, where 256 defines the QAM constellation, has a 51.29 Mbps data rate. Each QAM modulates a single MPTS and is upconverted to a given RF.

Each service group is allocated a separate set of QAMs, each modulated at a unique RF frequency. An MPTS corresponding to a given QAM which belongs to a particular service group, has a unique transport_id number, so that there is one-to-one correspondence between the couples (transport_id, service_group_id) and (QAM/RF, service_group_id).

The SM allocates and controls the transmission path from on-demand services resources to the clients. Upon request from a client which belongs to a particular service group, for a particular video service, the SM initiates the set of control commands to the on-demand services resources, to stream the requested service to an edge device with available QAM which belongs to the corresponding service group, and to the edge device to pack the stream into the specific MPTS corresponding to the particular QAM under defined service_id number. The SM also delivers the QAM frequency/transport_id and the service_id information to the requesting client set-top converter box (STB). The STB then tunes to the particular QAM frequency and decodes the requested service.

The SPTS is streamed to the particular edge device and QAM over internet and user datagram protocols (IP:UDP), where IP address stands for the selected edge address, and UDP port number encodes the selected QAM and service_id allocated to the particular service.

An SM in a closed on-demand architecture, controls the entire edge/QAM devices for all the service groups, so that no other external streaming service can be streamed through a particular QAM without causing possible collusion with other services allocated by the SM. The collusion could be in the sense of joining an MPTS with a service_id number which is equal to the one of a service allocated by the SM to the same MPTS, in that case the decoding of the services with same service_id number would be corrupted, or in the sense of joining an MPTS such the sum of data rate allocated to the MPTS by the SM with that of the external service, exceeds the QAM maximal rate, in that case either of the MPTS services might be corrupted.

Next generation on-demand architecture enables multiple on-demand systems to share the same set of edge devices and QAMs, providing different on-demand services to the same service groups. This task is either achieved through static partitioning of edge/QAMs between the different systems, or through incorporating a higher-level centralized resource manager (CRM) which controls the SMs of the different on-demand systems, through dynamically allocating QAMs, or even bandwidth within QAMs, between the different systems based on bandwidth, economic and or other allocation criteria.

In order to enable integration of multiple on-demand systems under the next generation on-demand architecture, both systems should expose external interfaces to higher level manager, share common system allocation status, share and interface to the common resource devices.

SUMMARY

Aspects of the representative embodiments are directed to the integration of new external on-demand services into a closed on-demand system, with resource allocation and control provided by the original Session Manager (SM). The integration of external services is performed through embedding a pseudo on-demand video-title in the original system, for each new on-demand external service, with SPTS streaming bandwidth equal to the one of the external service plus some small threshold value, and which is activated by the original SM once a particular STB, which belongs to a particular group_id, initiates a request for the external service. Aspects of the representative embodiments also include an STB application which intercepts the original SM tuning information on the selected transport_id and service_id of the pseudo service and recovers the address of the selected edge device and QAM in the original system, associated with the intercepted transport_id, through the inverse mapping the couple (group_id, transport_id) to the edge and QAM IP and UDP port addresses which map is set by external management system. The STB application then initiates the external on-demand service with same edge and QAM but with a different unique external_service_id , through streaming of the external service to the recovered edge IP address and to a new UDP port number which encodes the original QAM address with the new unique external_service_id number of the external service, and then tunes to the new external_service_id.

In another representative embodiment, the generation of the pseudo on-demand video-title stream is described, with total bandwidth equal to the one of the associated external service plus a threshold value, with effective service bandwidth, which may include video audio and mpeg tables, equal to the threshold value, and the reminder filled with NULL packets. An edge device performing mpeg re-multiplexing of the pseudo service and associated external service into the MPTS, filters the NULL packets in the pseudo service, resulting with effective MPTS bandwidth equal to that of the original pseudo service, as allocated by the original SM.

DETAILED DESCRIPTION

Representative embodiments are described below with references to the accompanying drawings. It should be understood that the following description is intended to describe representative embodiments, and not to limit the invention defined in the appended claims.

Figure 1:
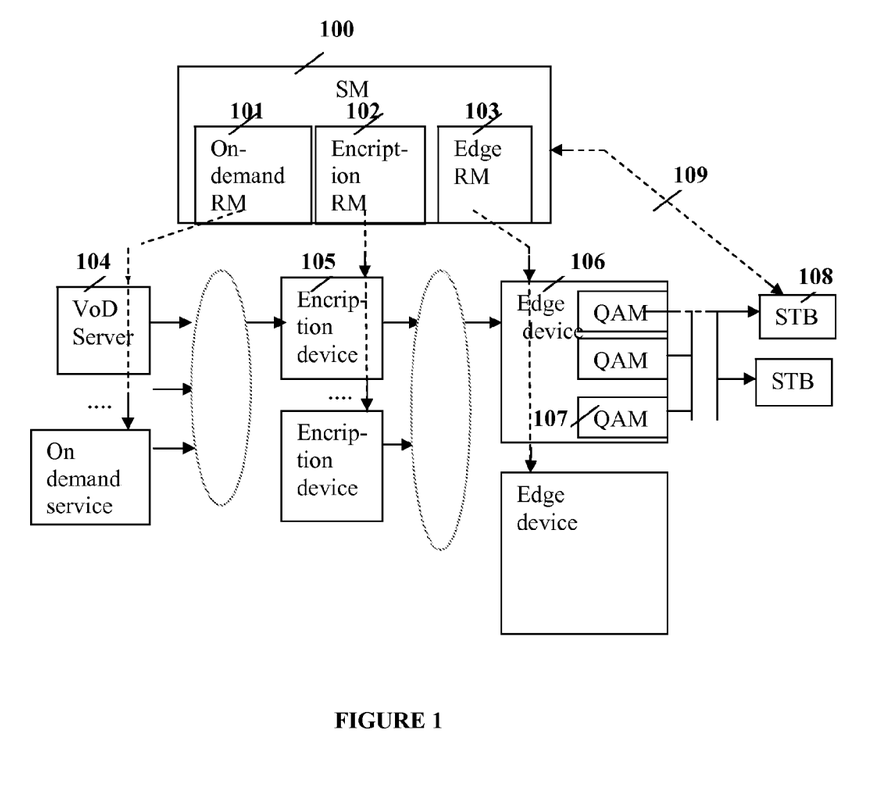
FIG. 1 illustrates a block diagram of an example on-demand CATV system.

FIG. 1 illustrates a block diagram of an on-demand system in hyfrid fiber-coax (HFC) networks. The system includes a plurality of on-demand services devices 104, here defined as video on-demand servers, which store a library of interactive services such as video on-demand movie streams, optionally a plurality of encryption devices 105 which encrypt the streamed services upon demand, and a plurality edge devices 106, each of which packetizes sub-sets of input streams into multi-program/service transport stream (MPTS) format, modulates each MPTS through a quadrature amplitude modulation (QAM) 107, and transmits the RF modulated signal to a set top converter box (STB) 108 at the client's premises. System control and resource allocation is performed by a session manager (SM) 100, which uses the sub-resource managers, on-demand resource manager 101, encryption resource manager 102 and edge resource manager 103, to select the on-demand service/VoD server, the encryption device and the edge and QAM devices for streaming a particular service, following a request of a particular STB 108 from SM 100 for the particular service. The STB 108 tunes to the QAM frequency and transport stream based on information provided by the SM 100 on the selected QAM and MPTS embedding the particular requested service.

Figure 2:
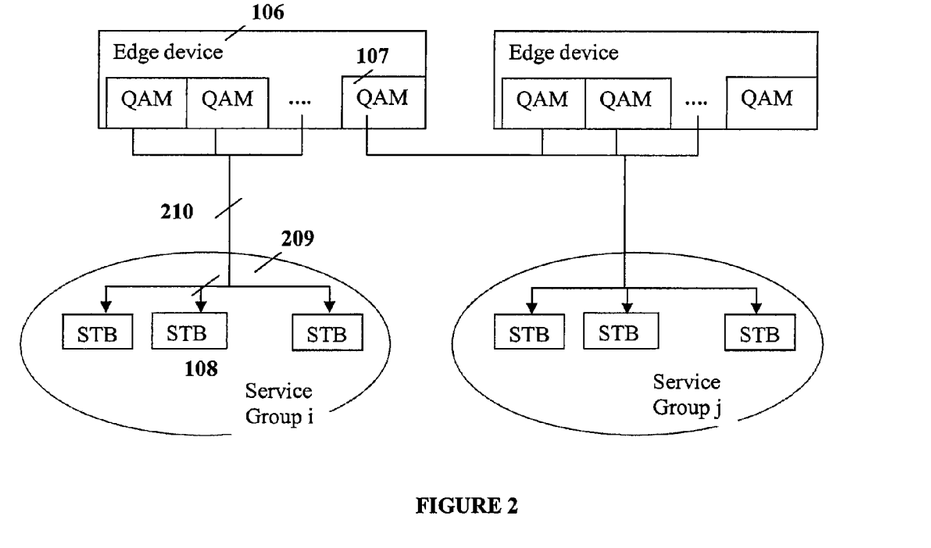
FIG. 2 illustrates a service group topology for the on-demand CATV system of FIG. 1.

FIG. 2 illustrates a service group topology. A service group 209 is composed of multiple disjoint sets of STBs, each of which connects to a different streaming zone 210, defined by a set of connected QAMs 107 with unique transmission RF and transport_id numbers. The QAMs associated with a particular streaming zone need not belong to the same edge device 106. The present architecture infers one-to-one correspondence between STB identity (ID) and QAM RF or transport_id, and the physical addresses of the transmitting edge and QAM. This correspondence is used to infer the physical addresses of above transmission devices, in the form of edge IP address and QAM port address, from the tunning information on QAM RF and the program transport_id provided by SM to the program requesting STB, following streaming resource allocation.

Figure 3:
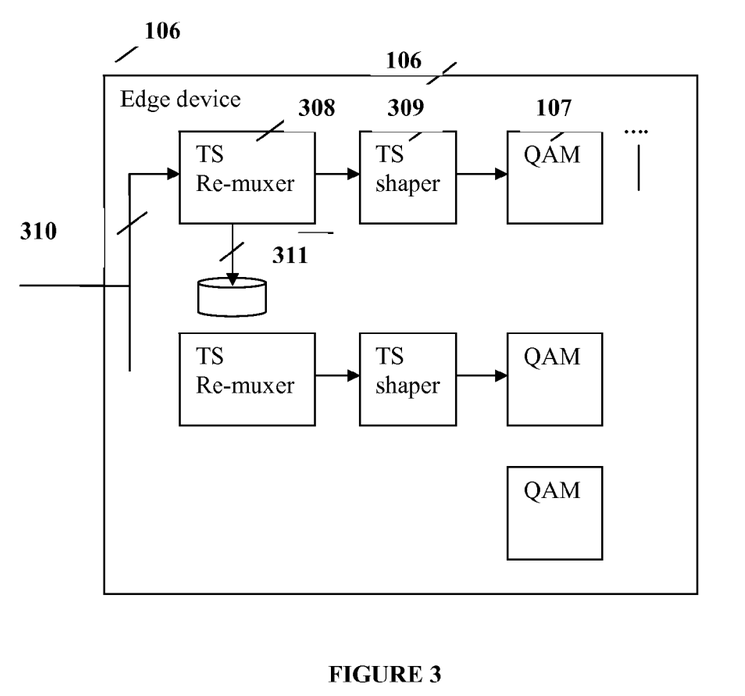
FIG. 3 illustrates a block diagram of an example edge device for the on-demand CATV system of FIG. 1.

FIG. 3 illustrates a block diagram for edge device 106. The MPTS for each QAM 107 is generated by the TS re-muxer 308 that filters the services packets of the multi-SPTS input 310 which do not belong to the particular MPTS, including NULL packets, and by the TS shaper buffer 309 which shapes the TS re-muxer output to QAM data rate through data buffering, packets output scheduling, and NULL packets padding if required.

Figure 4:
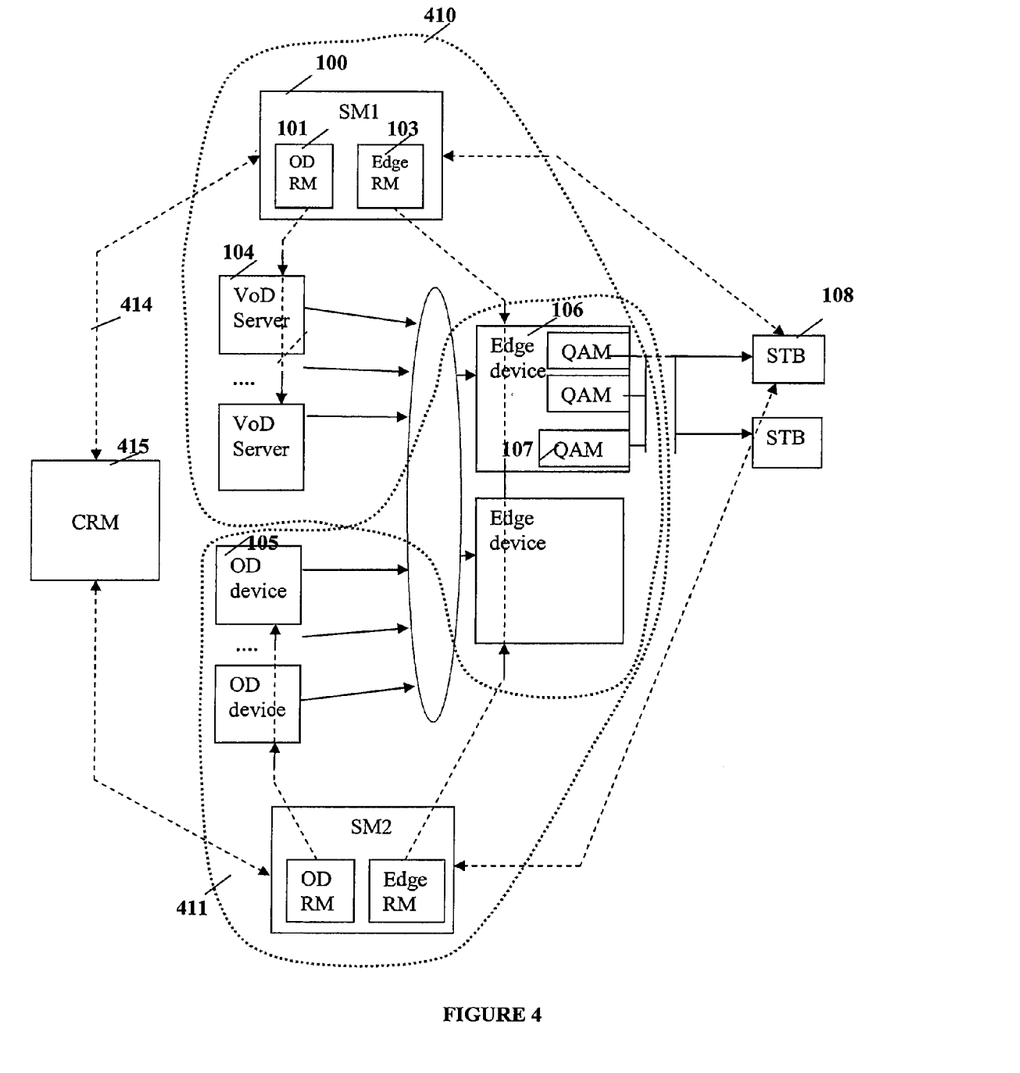
FIG. 4 illustrates a block diagram of an example next generation on-demand system.

FIG. 4 illustrates a block diagram of a next generation on-demand system in hybrid fiber-coax (HFC) networks, comprised of a plurality of on-demand systems 410, 411, . . . , serving a shared plurality of service groups. Each session manager (SM) allocates and controls the set of on-demand services devices which belong to the particular on-demand system. Both SMs of the different on-demand systems allocate and control a shared set of edge devices 106 based on edge and QAM resource allocation negotiated with the centralized resource manager (CRM) 415. A service request from the STB 108 for a particular service at a particular SM is sent to the particular SM, which negotiates and allocates the proper data streaming path. The CRM defines the set of QAMs or QAMs bandwidth allocated for each SM, which can request for additional resources in case the available allocated bandwidth for the particular SM cannot support the particular STB request. Present closed on-demand systems do not enable sharing the system edge and QAM devices with new external on-demand services provided by external SM and on-demand devices. Closed system edge QAM devices are controlled and allocated by the closed system SM and the external SM has no information on available QAM bandwidth, which may result with MPTS bandwidth overflow or with multiple identical service_ids in the same MPTS, in case the external SM chooses to stream a particular external service through a particular edge-QAM device.

Figure 5:
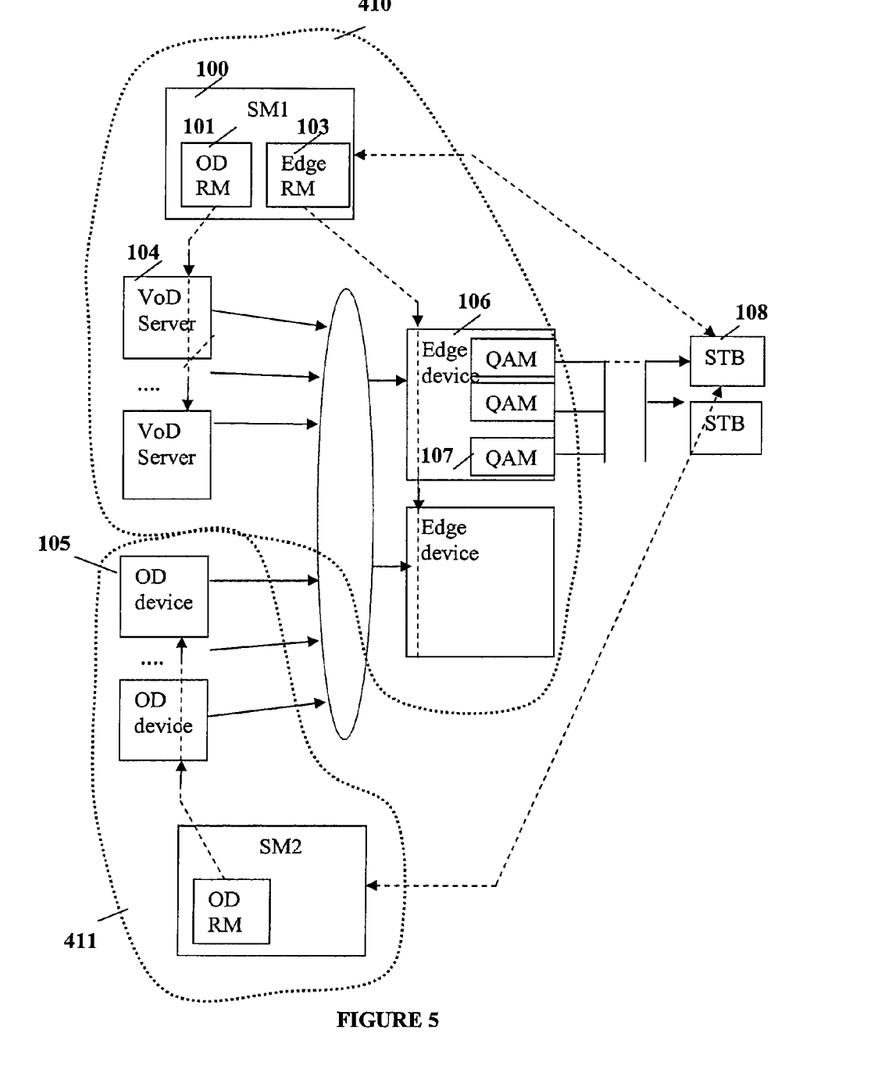
FIG. 5 illustrates a block diagram of integration of external services into a closed on-demand system.

FIG. 5 illustrates the integration of external on-demand services 411 to a closed on-demand system 410. In this architecture, there is no need for an external CRM and for external control and allocation of the edge devices, which role is done by the SM manager of the closed on-demand system. For each external program in the external on-demand system, a corresponding pseudo program is stored in the VoD server of the closed on-demand system. A service request from the STB 108 for an external program initiates a session request 109 for the associated pseudo program in the closed on-demand system, which in turn allocates the VoD server 104 and edge QAM 107 to stream the particular pseudo program to the requesting STB. The tuning information, including the QAM RF, transport_id and pseudo_service_id, which identifies the particular pseudo program, are sent by the SM1 to the STB, which uses this information to recover the IP and UDP port addresses of the selected edge and QAM. The STB then initiates a request for the external program from SM2, with streaming address equal to above edge and QAM address but with new unique external_service_id number corresponding to the external program. The STB then tunes to the new external_service_id program. The representative embodiments provide for external services integration into a closed on-demand system through a simple change in the STB application, which otherwise requires a major system revision to next generation on-demand architecture to enable the integration of the new services. The STB application, rather than tuning to the closed on-demand system service, extracts the allocated edge and QAM and initiates an external service request from the external SM with streaming request through the extracted address of edge and QAM.

Figure 6:
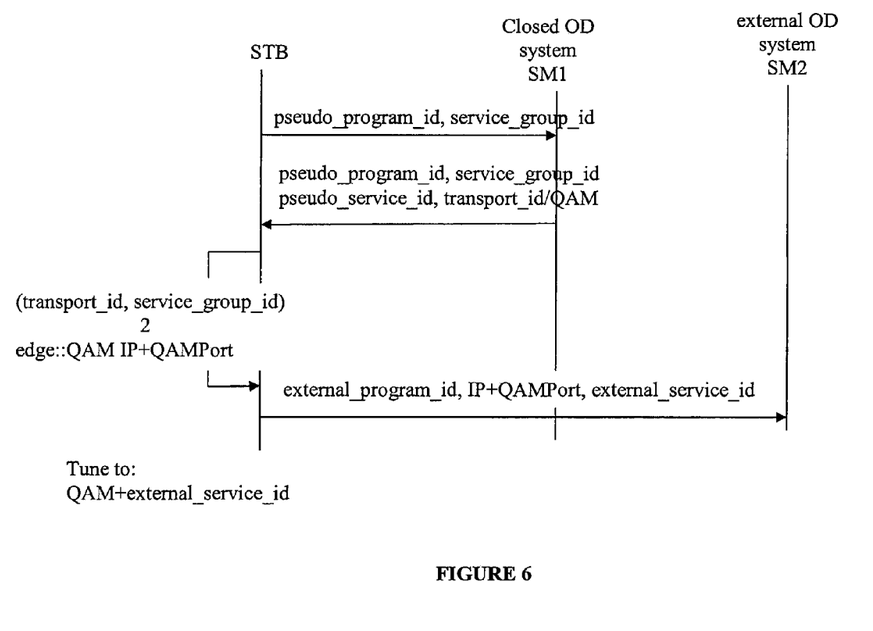
FIG. 6 illustrates a flow control of external services in an example closed on-demand system.

FIG. 6 illustrates a flow control of an external program for an on-demand system. Upon request for an external program, the STB initiates a request to SM1 in the closed on-demand system for the associated pseudo_program_id. Following allocation of pseudo_program_id and edge+QAM, SM1 provides the tuning information to the STB in the form of MPTS tansport_id and the pseudo_service_id which carries the particular pseudo program. The STB application then computes the address of the selected edge and QAM based on external provided mapping and initiates an external_program_id request from the SM2 of the external on-demand system, with info on edge and QAM streaming address, and with selected external_service_id number. The STB then tunes to the external_service_id.

Figure 7:
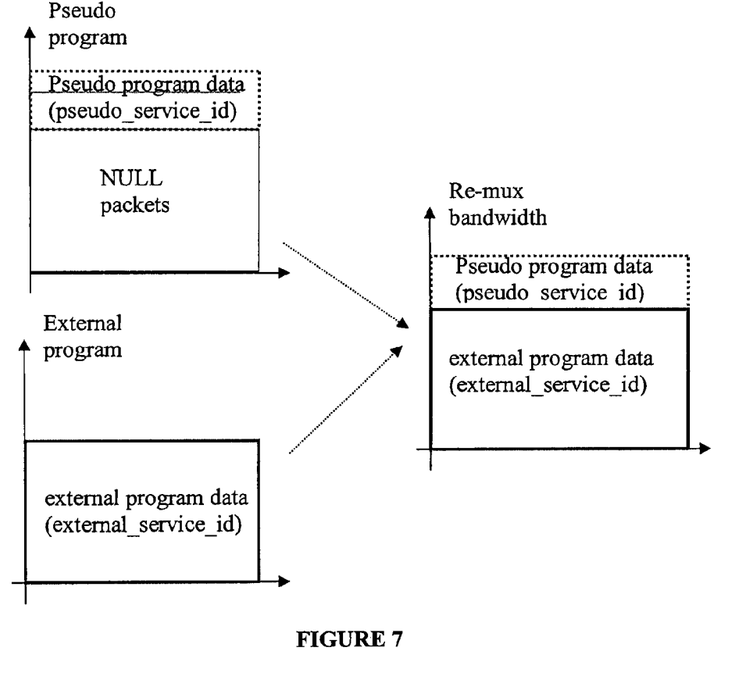
FIG. 7 illustrates a re-multiplexing of a pseudo service with an associated external service.

FIG. 7 illustrates the re-multiplexing of an external program with an associated pseudo program. The pseudo program and the external program are combined according to allocated bandwidth, as shown on the graphs of FIG. 7.

The foregoing description of representative embodiments has been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

The invention claimed is:

1. a system for providing on-demand services, the system comprising:
a multiplexer configured to multiplex a plurality of single service transports into a multiple service transport and to filter NULL packets in the multi service transport;
modulator configured to modulate the multiple service transport;
an interface configured to receive on-demand services from a first source of single service transports with a corresponding first unique set of multiple service transport single service identifiers and from a second source of single service transports with a corresponding second unique set of multiple service transport single service identifiers; and
a session manager device configured to:
allocate resources of the multiplexer and the modulator;
allocate a first service from the first source of single service transports;
stream a requested service using the allocated resources;
provide information about the allocated resources;
where the session manager is further configured to determine a first streaming address of the multiplexer and a second streaming address of the modulator;
a control box configured to determine the first streaming address and the second streaming address from information provided by the session manager about allocated resources;
wherein once the control box determines the first streaming address and the second streaming address corresponding to the first service, is further configured to
request a second service from a second session manager device;
set streaming addresses for the second service equal to the first streaming address and the second streaming address of the first service;
set a second service id for the second service; and
tune to second service streaming parameters and to the second service id;
generate the first service at a bandwidth equal to the bandwidth of the second service plus a given delta value;
generate an audio-visual plurality of single service transports at a delta value bandwidth; and
multiplex the audio-visual plurality of single service transports with a NULL packets stream having a bandwidth equal to the bandwidth of the second service.

2. The system of claim 1, wherein the multi-service transport comprises a transport_id and the provided information about allocated resources include the transport_id of the multi-service transport which contains the requested first service and the service_id of the service.

3. the system of claim 1, where the first streaming address is configured as an IP address and the second streaming address is configured as a port number.

4. the system of claim 1, wherein the control box belongs to a unique set of control boxes defined by a unique service group id.

5. The system of claim 4, wherein the control box is further configured to determine the IP address of the multiplexer and the port number of the modulator from information provided by the session manager about the transport_id of the multi-service transport, and from the service_group_id of the control box.

6. The system of claim 1, wherein the first source of single service transports includes video on-demand services.

7. The system of claim 1, wherein the first source of single service transports includes compressed audio-visual content of an interactive service.

8. The system of claim 7, wherein the interactive service includes video games.

9. a system for providing on-demand services, the system comprising:
- means for multiplexing a plurality of single service transports into a multiple service transport;
- means for filtering NULL packets in the multi service transport;
- means for modulating the multiple service transport;
- means for receiving on-demand services from a first source of single service transports with a corresponding first unique set of multiple service transport single service identifiers and from a second source of single service transports with a corresponding second unique set of multiple service transport single service identifiers;
- means for allocating resources of the multiplexing means and the modulating means;
- means for allocating a first service from the first source of single service transports;
- means for streaming a requested service using the allocated resources; and
- means for providing information about the allocated resources;
- where the session manager is further configured to determine a first streaming address of the multiplexer and a second streaming address of the modulator;
- a control box configured to determine the first streaming address and the second streaming address from information provided by the session manager about allocated resources;
- wherein once the control box determines the first streaming address and the second streaming address corresponding to the first service, is further configured to
- request a second service from a second session manager device;
- set streaming addresses for the second service equal to the first streaming address and the second streaming address of the first service;
- set a second service id for the second service; and
- tune to second service streaming parameters and to the second service id;
- means for generating the first service at a bandwidth equal to the bandwidth of the second service plus a given delta value;
- means for generating an audio-visual plurality of single service transports at a delta value bandwidth; and
- means for multiplexing the audio-visual plurality of single service transports with a NULL packets stream having a bandwidth equal to the bandwidth of the second service.

10. The system of claim 9, further comprising means for requesting an on-demand service from the first source of on-demand services.

11. The system of claim 9, further comprising means for managing devices used to stream, multiplex, and modulate on-demand services.

12. The system of claim 9, further comprising means for requesting a first service.

13. The system of claim 9, further comprising means for configuring the streaming address of the multiplexing device as an IP address and the streaming address of the modulating device as a port number.

14. a method for providing on-demand services, comprising:
- multiplexing a plurality of single service transports into a multiple service transport;
- filtering NULL packets in the multi service transport;
- modulating the multiple service transport;
- receiving on-demand services from a first source of single service transports with a corresponding first unique set of multiple service transport single service identifiers and from a second source of single service transports with a corresponding second unique set of multiple service transport single service identifiers;
- allocating resources of the multiplexing means and the modulating means;
- allocating a first service from the first source of single service transports;
- streaming a requested service using the allocated resources; and
- providing information about the allocated resources;
- where the session manager is further configured to determine a first streaming address of the multiplexer and a second streaming address of the modulator;
- a control box configured to determine the first streaming address and the second streaming address from information provided by the session manager about allocated resources;
- wherein once the control box determines the first streaming address and the second streaming address corresponding to the first service, is further configured to
- request a second service from a second session manager device;
- set streaming addresses for the second service equal to the first streaming address and the second streaming address of the first service;
- set a second service id for the second service; and
- tune to second service streaming parameters and to the second service id;
- generate the first service at a bandwidth equal to the bandwidth of the second service plus a given delta value;
- generate an audio-visual plurality of single service transports at a delta value bandwidth; and
- multiplex the audio-visual plurality of single service transports with a NULL packets stream having a bandwidth equal to the bandwidth of the second service.

15. The method of claim 14, further comprising requesting on-demand service.

16. The method of claim 14, further comprising managing devices used to stream, multiplex, or modulate on-demand services.

17. the method of claim 14, further comprising configuring the first streaming address as an IP address and the second streaming address as a port number.

18. The method of claim 14, further comprising streaming video on-demand services.

19. The method of claim 14, further comprising storing, executing, and streaming compressed audio-visual content of an interactive service, wherein the interactive service includes video games.

* * * * *

UNITED STATES PATENT AND TRADEMARK OFFICE
CERTIFICATE OF CORRECTION

PATENT NO. : 8,321,903 B2
APPLICATION NO. : 12/180944
DATED : November 27, 2012
INVENTOR(S) : Natan Peterfreund It is certified that error appears in the above-identified patent and that said Letters Patent is hereby corrected as shown below:

IN THE CLAIMS

The exact claim and line number where the errors in the issued patent are:

In Claim 1, column 6, line 2 of the issued patent, capitalize the first word "a" to show as --A-- at the beginning of the sentence.

In Claim 1, column 6, line 2 of the issued patent, delete "services,the" and add --services, the--.

In Claim 1, column 6, line 7 of the issued patent, insert --a-- before the word "modulator".

In Claim 3, column 6, line 52 of the issued patent, capitalize the first word "the" to show as --The-- at the beginning of the sentence.

In Claim 4, column 6, line 55 of the issued patent, capitalize the first word "the" to show as --The-- at the beginning of the sentence.

In Claim 4, column 6, lines 56-57 of the issued patent, delete "service group id" and add --service_group_id--.

In Claim 9, column 7, line 6 of the issued patent, capitalize the first word "a" to show as --A-- at the beginning of the sentence.

In Claim 14, column 8, line 5 of the issued patent, capitalize the first word "a" to show as --A-- at the beginning of the sentence.

Signed and Sealed this
Twenty-fourth Day of September, 2013

Teresa Stanek Rea
*Deputy Director of the United States Patent and Trademark Office*

In Claim 14, column 8, line 47 of the issued patent, delete the word "a" before the word NULL.